(12) United States Patent
Paper et al.

(10) Patent No.: US 7,255,131 B2
(45) Date of Patent: Aug. 14, 2007

(54) VALVE FOR A FIRE HOSE LINE

(76) Inventors: John C. Paper, Woodleigh La., Cameron Park, CA (US) 95682; Daniel R. Nelson, Velvet Horn La., Rescue, CA (US) 95672

( * ) Notice: Subject to any disclaimer, the term of this patent is extended or adjusted under 35 U.S.C. 154(b) by 0 days.

(21) Appl. No.: 11/234,571

(22) Filed: Sep. 22, 2005

(65) Prior Publication Data
US 2007/0062590 A1    Mar. 22, 2007

(51) Int. Cl.
*F16K 11/087* (2006.01)
(52) U.S. Cl. ............... 137/625.47; 251/148; 169/18; 285/12; 285/127.1
(58) Field of Classification Search .......... 137/625.46, 137/625.47, 883; 251/148; 169/5, 16, 18; 285/12, 127.1, 133.4
See application file for complete search history.

(56) References Cited

U.S. PATENT DOCUMENTS

| | | | |
|---|---|---|---|
| 312,155 A | 2/1885 | O'Herin | |
| 1,077,697 A | 11/1913 | Gates | |
| 1,774,685 A | 9/1930 | Vickers | |
| 1,807,085 A | 5/1931 | Crickmer | |
| 3,721,265 A | 3/1973 | Hoffland | |
| 3,976,102 A * | 8/1976 | Crocker | 137/625.47 |
| 4,043,158 A | 8/1977 | Bochan | |
| 4,669,548 A * | 6/1987 | Colodner et al. | 169/12 |
| 4,702,269 A | 10/1987 | Schuler | |
| 4,915,133 A | 4/1990 | Harrison | |
| 5,368,106 A * | 11/1994 | Coughlin | 169/70 |
| 5,944,055 A * | 8/1999 | Dicky | 137/625.47 |
| 5,988,220 A | 11/1999 | Sakaki | |
| 6,675,834 B1 | 1/2004 | Lai | |

* cited by examiner

*Primary Examiner*—John Fox
(74) *Attorney, Agent, or Firm*—Buchanan Ingersoll & Rooney PC

(57) ABSTRACT

A valve for a hose line, the valve having an inlet having a threaded female swivel fitting, a first outlet having an external thread, and a second outlet having an external thread. The inlet and the first outlet are at a 90 degree angle to each other and the inlet and the second outlet are 180 degrees to each other. A three-port ball valve having an inlet port, a first outlet port, and a second outlet port controls the directional flow within the valve.

8 Claims, 5 Drawing Sheets

VALVE FOR A FIRE HOSE LINE

BACKGROUND

In certain geographical areas, wildland or wildfires can race through inhabited areas destroying residential and commercial property worth millions of dollars. Wildfires are often ignited by natural phenomena such as by lightening storms or caused by mankind. Once a wildfire is ignited, it creates an environment that requires fuel, oxygen, and suitable temperature conditions to continue to exist.

In order to extinguish the wildland or wildfire, the goal of the firefighting operations is to contain the fire by progressively extending a series of fire hoses forming a progressive hose line or "wet line" around the perimeter of the fire. Typically, the wet line is comprised of a one and one half (1.5) inch hose line or main line with a smaller, typically one (1.0) inch fire hose at intervals of usually 100 feet. Accordingly, as the hose line is laid around the perimeter of the fire, it is necessary to clamp off the flow of water by means of a hose clamp to add the next length of hose.

Historically, wildland firefighters have used hose adapters referred to as forestry tees that divert water from one and one half (1.50) inch hose into one (1.0) inch hose that is used to extinguish the interior of the fire after the fire contained. In addition, in more recent history, firefighters have started using inline shut-off valves in lieu of hose clamps to stop the flow of water to enable them to connect additional lengths of hose to extend around the perimeter of the fire.

This invention combines a traditional forestry tee and an inline shut-off valve into a single apparatus that allows a firefighter to divert the flow of water down the extended hose, to the one-inch hose, to both hoses or is able to shut the flow off completely, which can potentially cut costs, save time and reduce the weight and space of apparatuses currently carried by fire personnel.

SUMMARY

In accordance with one embodiment, a valve for a hose line comprises: an inlet having a threaded female swivel fitting; a first outlet having an external thread; a second outlet having an external thread, wherein the inlet and the first outlet are at a 90 degree angle to each other and the inlet and the second outlet are 180 degrees to each other; and a three-port ball valve having an inlet port, a first outlet port, and a second outlet port.

In accordance with a further embodiment, a fire protection system comprises: a plurality of hose lines adapted to receive water from a water source; a plurality of valves connecting each of the plurality of hose lines to one another, the valves comprising: an inlet having a threaded female swivel fitting; a first outlet having an external thread; a second outlet having an external thread, wherein the inlet and the first outlet are at a 90 degree angle to each other and the inlet and the second outlet are 180 degrees to each other; and a three-port ball valve having an inlet port, a first outlet port, and a second outlet port; and a plurality of branches lines extending from the first outlet

DETAILED DESCRIPTION

Figure 1:
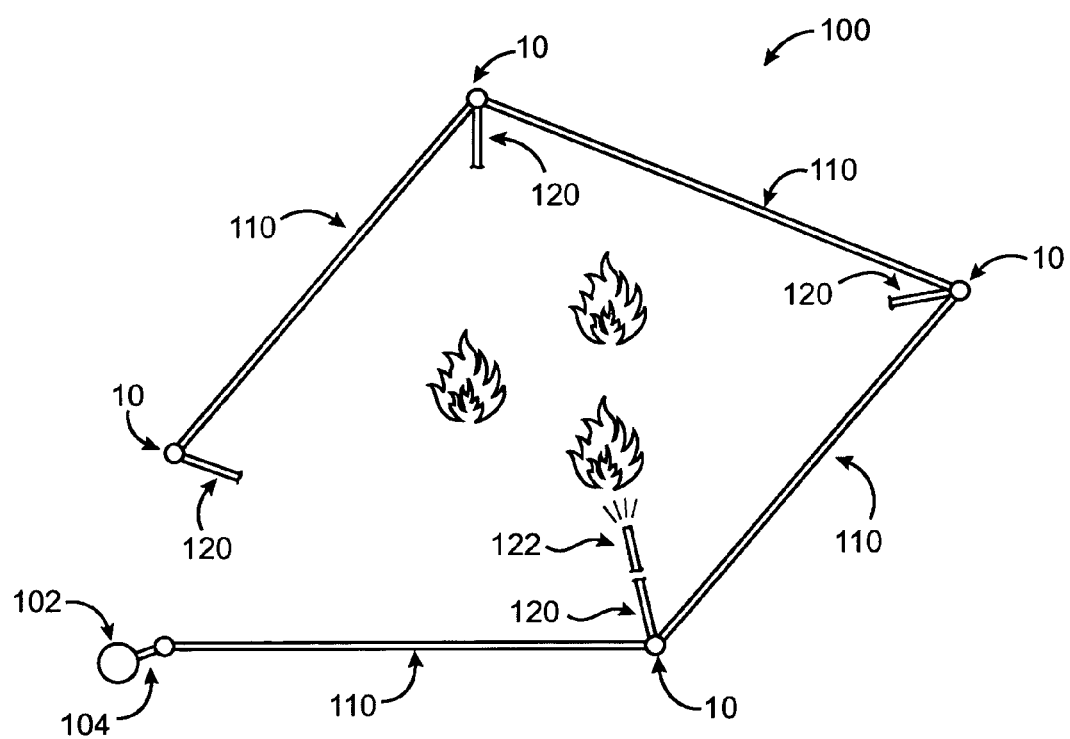
FIG. 1 shows a diagram of a progressive hose line forming a perimeter around a series of small wildfires.

FIG. 1 shows a diagram of a progressive hose line 100 around a perimeter of a series of small wild fires. The progressive hose line 100 typically comprises a water source 102, a high volume or high pressure pump 104, a plurality of main feeder hose lines 110, a plurality of valves 10, and a plurality of branch lines 120. As shown in FIG. 1, the progressive hose line 100 is comprised of a water source 102 in the form of a water hydrant or other source of water. The high volume or high pressure pump 104 is typically a fire truck or pump truck, which pumps the water to the hose line 110 for delivery to a nozzle 122 on the end of each of the branch lines 120.

The main hose line 110 is typically a 150-foot length hose having a diameter of approximately 1.5 inches. However, it can be appreciated that the main hose line 110 can be a 50-foot or other suitable length without departing from the present invention. Furthermore, the main hose line 110 can be any suitable flexible conduit for moving water or suitable liquid under pressure through the main hose line 110. Typically, the hose line 110 can handle water pressure of up to about 600 pounds per square inch (psi). The hose line 110 can be made of various materials including cotton, rubber or plastic (such as polyvinyl chloride, PVC); construction may be braided, woven, wrapped or extruded, often in layers (liner and jacket); and hose construction and size differs according to the hose line's 110 intended use (e.g., hard suction, attack, forestry, booster).

As shown in FIG. 1, the valve 10 directs water from the one and one half (1.5)-inch hose line around the perimeter of the fire to the one (1.0) inch branch lines 120. The branch lines are typically 100 length hose lines having an approximate one (1.0) inch diameter and being able to handle water pressures of about 600 psi. However, it can be appreciated that the branch lines 120 can be found in lengths of 100 feet or any other suitable length. The branch line 120 is also constructed of a suitable flexible conduit for moving water or suitable liquid under pressure through the branch line 120, such as cotton, rubber or plastic (such as polyvinyl chloride, PVC). It can also be appreciated that the branch line 120 construction may be braided, woven, wrapped or extruded, often in layers (liner and jacket), with hose construction and size differing according to its intended use (e.g., hard suction, attack, forestry, booster).

Figure 2:
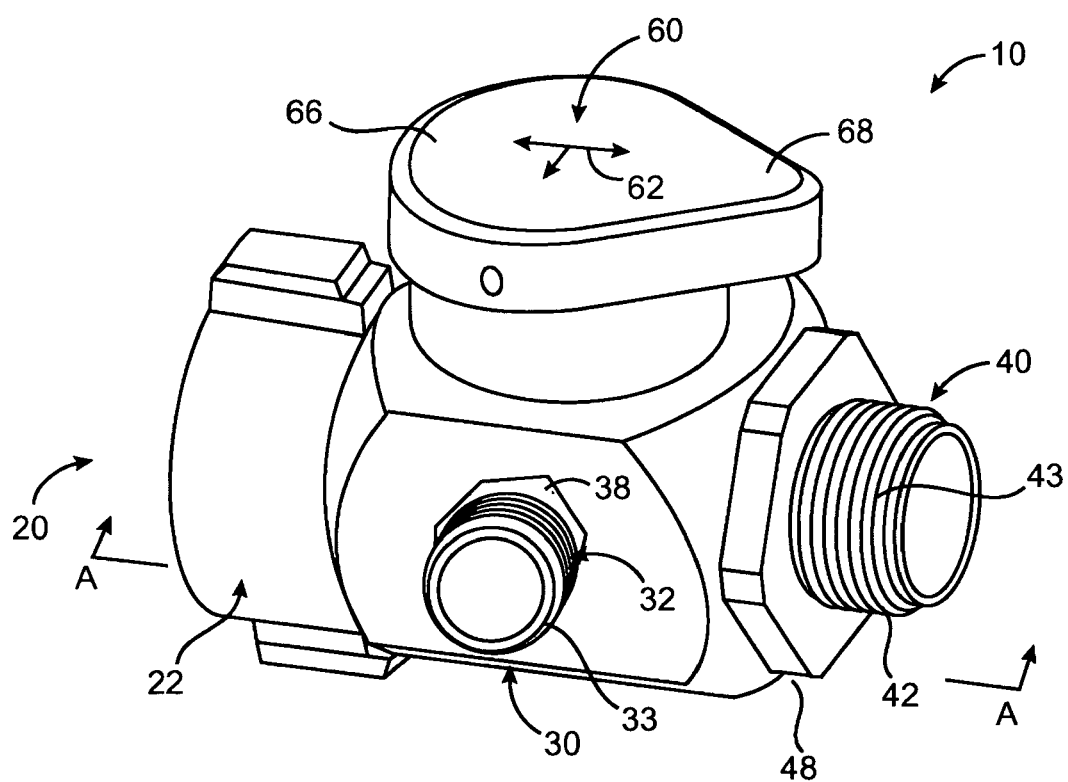
FIG. 2 shows a perspective view of a valve according to one embodiment.
Figure 4:
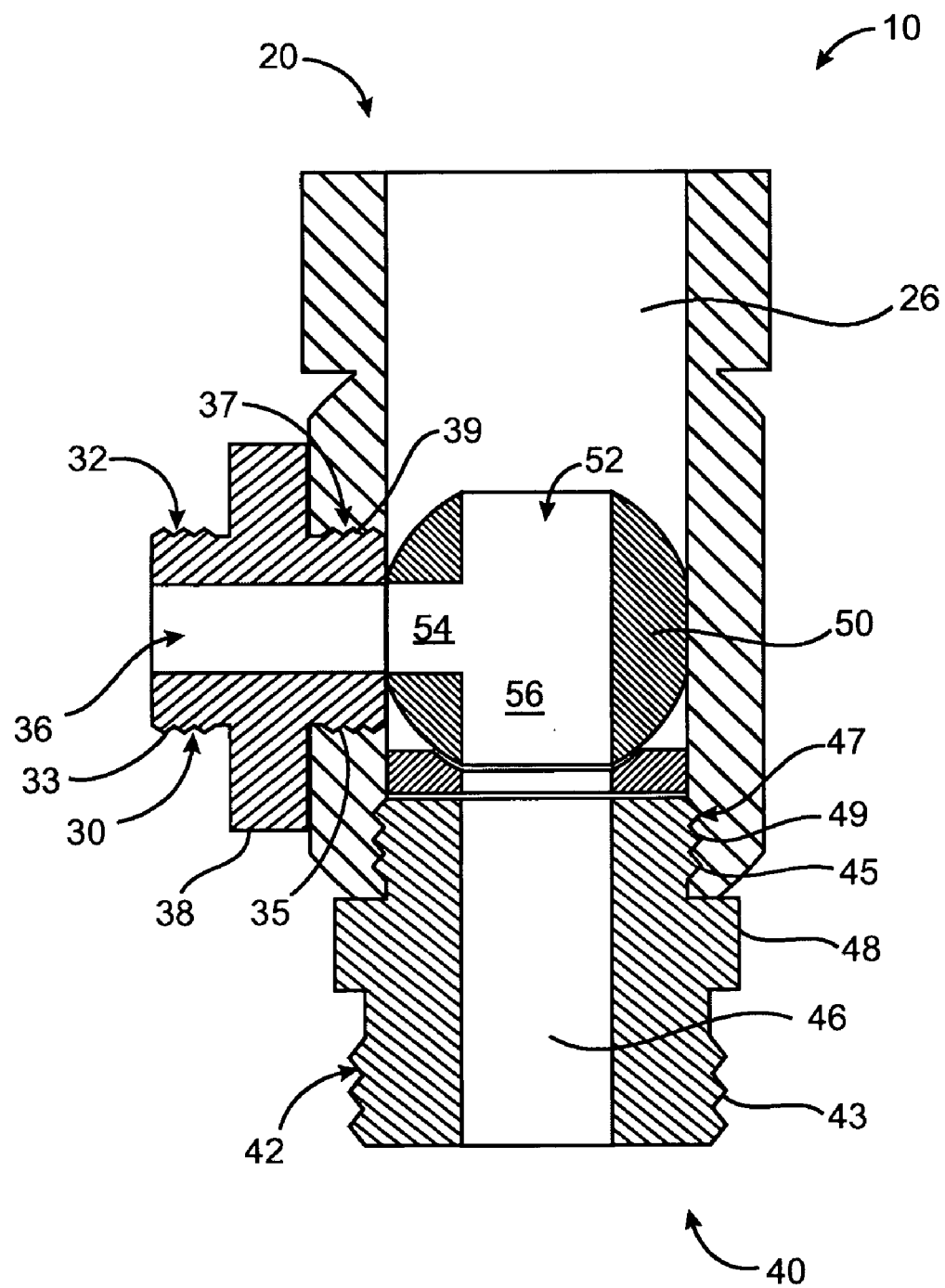
FIG. 4 shows a cross sectional view of the valve of FIG. 2, along the lines A-A.

FIG. 2 shows a perspective view of a valve 10 for connecting main line hoses 110 to a branch line 120 according to one embodiment. As shown in FIG. 2, the valve 10 includes an inlet 20, a first outlet 30, and a second outlet 40. The directional flow of water or other liquids is controlled by a ball valve 50 (FIG. 4). As shown, the ball valve 50 can be operated by a valve handle 60 or other suitable device. The valve 10 will typically be used in the construction of a progressive hose line 100 or "wet line." As shown in FIG. 1, the hose line 100 is typically comprised of a control line put in by means of a progressive hose line 110 using a 1½ inch feeder hose line with one (1.0) inch branch lines 120 every 200 feet.

As shown in FIG. 2, the valve 10 includes an inlet 20 with a threaded female swivel fitting 22, which is configured to receive the hose line 110. The swivel fitting 22 preferably includes an inwardly flared sleeve with an internal female thread 24 (FIG. 3), placed rotatably around the inlet 20 of the valve 10. In the unattached position the swivel fitting 22 is loose on the inlet 20, and is prevented from sliding off the inlet 20 by an annular outward flare of the inlet 20, which engages the inward flare of the swivel fitting 22.

In use, the swivel fitting 22 permits the valve 10 to swivel to any circumferential position around the male thread (not shown) of the hose line 110 as the valve 10 is attached to the hose line 110. It can be appreciated that to improve the connection, a hose washer can be placed at the flared end of the swivel fitting 22 which is then screwed onto the hose line 110 until the fitting 22 contacts the washer for a watertight seal.

The swivel fitting 22 is preferably comprised of a one and one half (1.5) inch standard national hose thread female swivel fitting 22. However, it can be appreciated that the inlet 20 can be fitted with any suitable fitting 22, which can receive hose lines from about 0.5 inches to about 5.0 inches, and more preferably about 1.0 inches to about 1.5 inches and most preferably about 1.5 inches.

In a further embodiment, the internal female thread 24 is a Higbee cut; however, other suitable thread 24 cuts can be used, which allow for a quick fitting connection with the hose line 110. The Higbee cut (or "Higby cut") is a tapered thread termination in a fire hose coupling or valve 10, which avoids cross-threading. The location of tapered thread 24 is indicated by a notch cut into a single lug on the hose coupling or valve 10. Typically, if the notches are aligned on mating couplings, the Higbee cuts are aligned and the threads 24 will immediately engage when the swivel fitting 22 is turned.

As shown in FIG. 2, the valve 10 also includes a first outlet 30 and a second outlet 40. The first outlet 30 is preferably at an approximate 90 degree or right angle to the inlet 20. The first outlet 30 is preferably fitted with a one-inch (1.0) national pipe straight hose male fitting 32. The male fitting 32 comprises an external thread 33 and an internal thread 35. The external thread 33 is adapted to receive a female thread (not shown) of the branch line 120. The internal thread 35 (FIG. 4) is configured to be received within a first outlet opening 37 having a corresponding thread 39. The first outlet 30 can be also be fitted with an external hexagonal or other suitable shape fitting 38 to assist with assembly of the first outlet 30 to the valve 10.

It can be appreciated that other male fittings 32 can be used, including any suitable standard of the fire service including quarter turn or quick connect fittings. As shown in FIG. 1, the first outlet 30 is adapted to connect to a one (1.0) inch hose line or branch line 120. However, it can be appreciated that the first outlet 30 can be fitted with any suitable external thread 33, which can receive hose lines from about 0.5 inches to about 5.0 inches, and more preferably about 1.0 inches to about 1.5 inches and most preferably about 1.0 inches.

The second outlet 40 is on the opposite end of the inlet 20. The second outlet is preferably fitted with a one and one half (1.5) inch standard national hose male fitting 42. However, it can also be appreciated that other male fittings can be used, including any suitable fire service standard fitting, any suitable quarter turn or quick connect fitting. The male fitting 42 comprises an external thread 43 and an internal thread 45 (FIG. 4). The external thread 43 is adapted to receive a female thread (not shown) of the hose line 110. The internal thread 45 is configured to be received within a first outlet opening 47 having a corresponding thread 49. The second outlet 40 also can be also be fitted with an external hexagonal or other suitable shape fitting 48 to assist with assembly of the second outlet 40 to the valve 10.

In addition, it can be appreciated that in a further embodiment, the second outlet 40 can be fitted with any suitable external thread 43, which can receive hose lines from about 0.5 inches to about 5.0 inches, and more preferably about 1.0 inches to about 1.5 inches and most preferably about 1.5 inches.

The valve handle 60 is preferably a teardrop or raindrop shape having a head 66 and a tail 68. The tail 68 provides a directional pointing portion, such that during times of high stress, darkness and for ease of use, the valve handle 60 and the corresponding positions of the water flow can be ascertained based on the relative position of the valve handle 60 as compared to the valve 10. In addition, the valve handle 60 can have an engraved or raised impression 62 showing the relative flow positions of the valve 10. The engraved or raised impression 62 comprises a series of arrows or other shapes showing the directional flow of the water or liquid within the valve 10.

Figure 3:
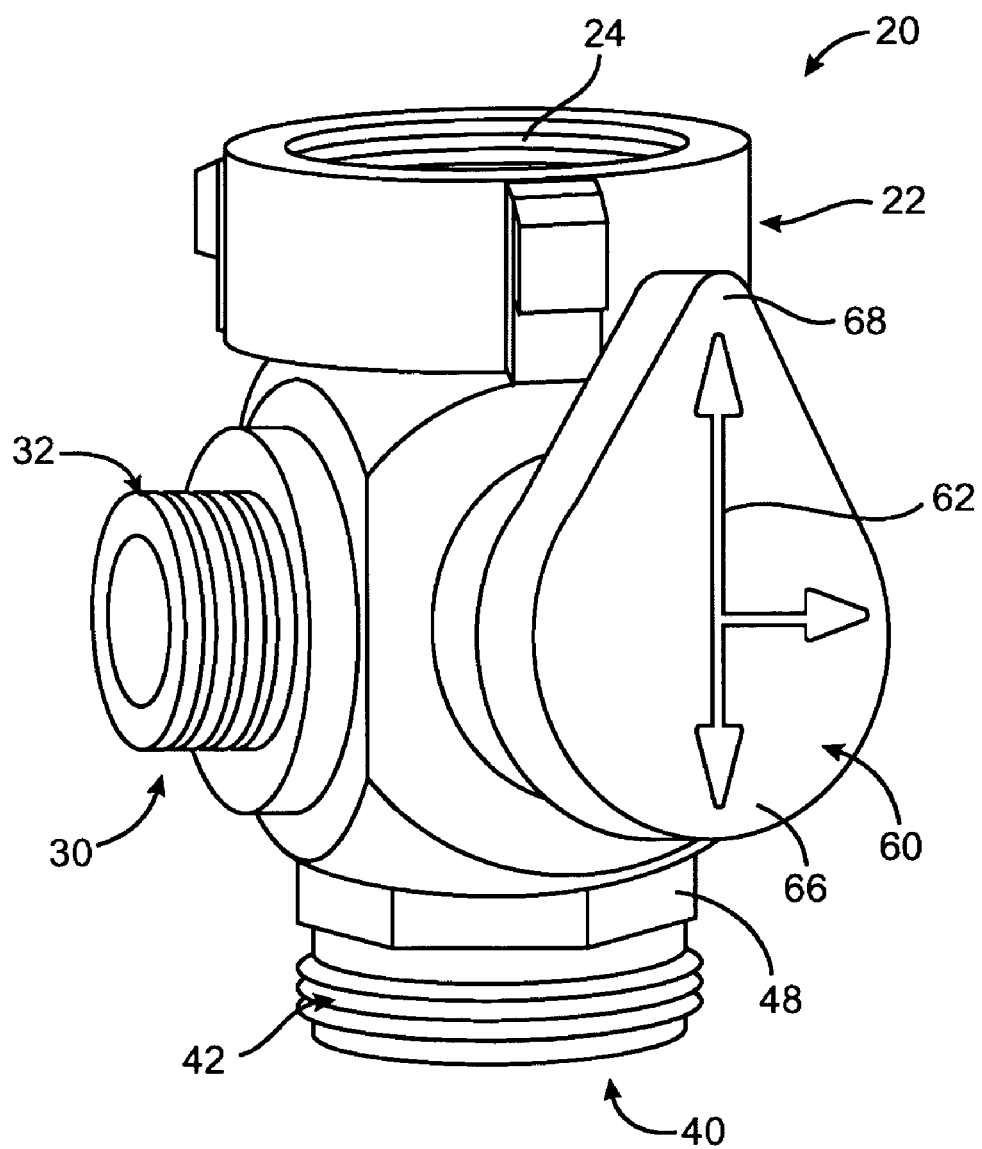
FIG. 3 shows a perspective view of the valve of FIG. 2 from a different perspective.

As shown in FIG. 3, the valve 10 is comprised of the inlet 20 preferably having a threaded female swivel fitting 22 with a Higbee cut thread 24, a first outlet 30 having a one inch (1.0) national pipe straight hose male fitting 32, and a second outlet 40 having a with a one and one half (1.5) inch standard national hose male fitting 42.

FIG. 4 shows a cross sectional view of the valve 10. As shown in FIG. 4, the ball valve 50 is a three-port valve, which is attached to the valve handle 60. By turning the valve handle 60, the valve 10 can be placed in four different flow control positions. The three-port ball valve 50 has an inlet port 52, a first outlet port 54, and a second outlet port 56. In use, the inlet port 52 and the second outlet port 56 are interchangeable to the extend that the second outlet port 56 in a flow through position with a closed first outlet 30, the second outlet port 56 will serve as an inlet and the inlet port 52 with serve as an outlet.

FIGS. 5A-5D show a series of top views of the valve handle 60 and the corresponding directional flow within the ball valve 50.

Figure 5A:
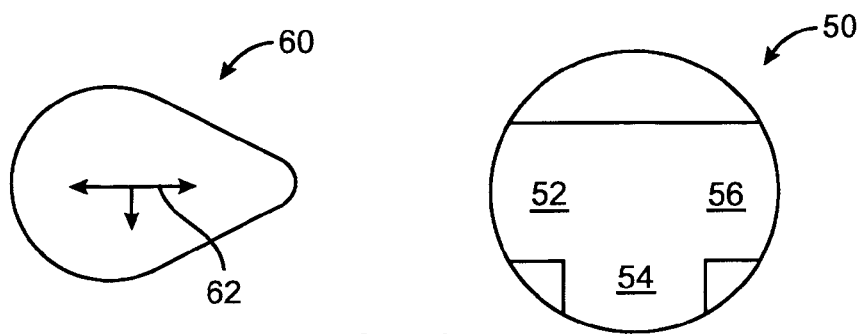
FIGS. 5A-5D show a series of top views of the valve and the corresponding directional flow within the valve.

FIG. 5A shows the valve handle 60 in an open position, wherein the inlet port 52 is open to receive water from the hose line 110, which is delivered to the first outlet port 54 and the second outlet port 56, which respectively delivers water the branch line 120 and hose line 110, respectively.

Figure 5B:
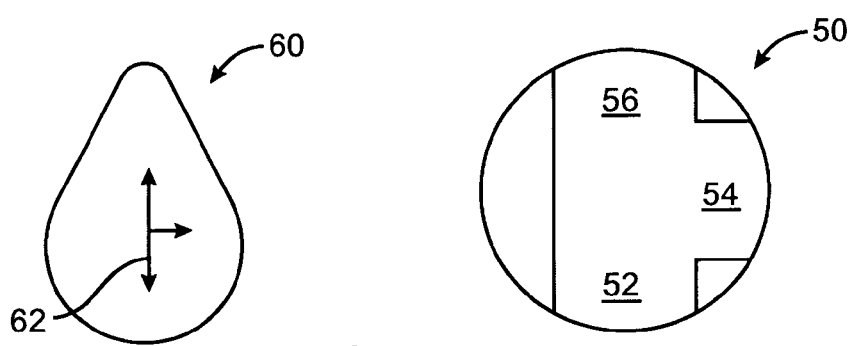

FIG. 5B shows the valve handle 60 in a closed position wherein the inlet port 52, the first outlet port 54 and the second outlet port 56 of the ball valve 50 are turned away, i.e. do not receive water from the hose line 110. As such, the valve does not distribute the water from the input hose line 110. The valve 10 acts a shutoff valve.

Figure 5C:
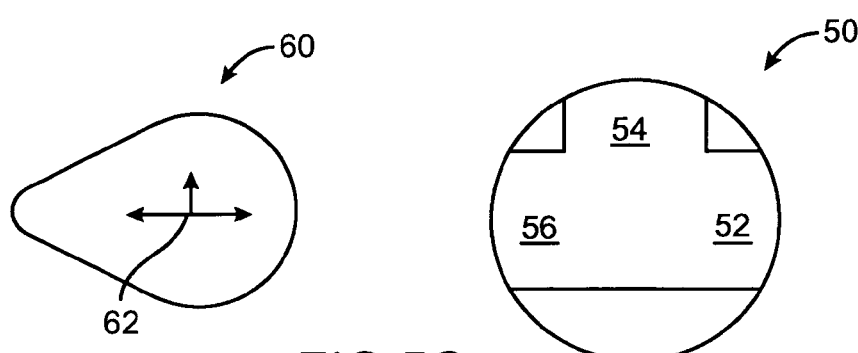

FIG. 5C shows the valve handle 60 in an open hose line configuration, wherein water enters into the valve 10 and is directed to the second outlet 40 for delivery to the hose line 110.

Figure 5D:
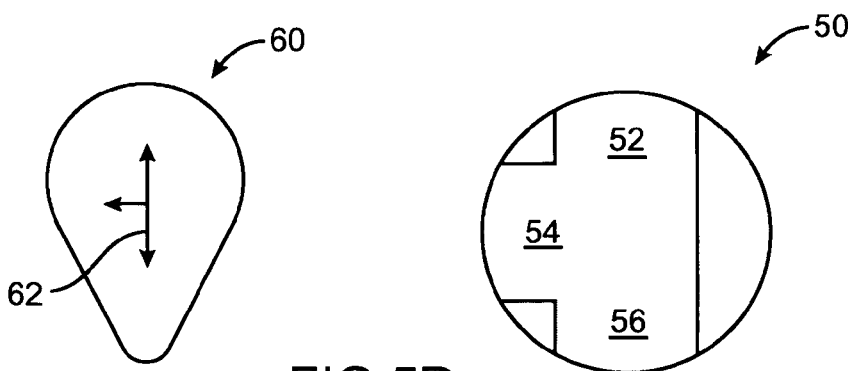

FIG. 5D shows the valve handle 60 is an open branch line configuration wherein water enters the inlet 20 of the valve 10 and is delivered through the first outlet 30 to the branch line 120.

As shown in FIGS. 5A-5D, the valve 10 is a four position valve comprising a closed position (FIG. 5B), delivery to the only the branch line 120 (FIG. 5D), delivery through to the hose line 110 (FIG. 5C), and delivery to both the branch line 120 and hose line 110 (FIG. 5A). The ball valve 50 is controlled by the valve handle 60 that is rotatable through all four positions by means of turning while releasing a safety feature (not shown). Thus, in one embodiment, the handle 60 can be rotated to the 1 inch (or branch line 120), 1½ inch (or hose line 110), "BOTH" (branch line 120 and hose line 110) or "CLOSED" positions.

Although, the use of the valve has been described for use with fire hoses, the use of the valve 10 described herein is not limited to fire service use. In addition, the valve 10 will preferably be an injection molded high impact plastic, such as acrylonitrile-butadiene-styrene (ABS) copolymers, or other suitable synthetic or semi-synthetic materials that can be molded or extruded. It can be appreciated that the valve 10 can be machined or manufactured by other known methods. The ball valve 50 will preferably be manufactured of a nylon or high impact plastic, such as ABS or other suitable polymeric material. It can be appreciated that the valve 10 can be manufactured from any metallic material without departing from the present invention.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A valve for a fire hose line comprising:
   an inlet having a threaded female swivel fitting that is adapted to receive a fire hose line having a 1.5 inch tapered external thread;
   a first outlet having an external thread and adapted to receive a 1.0 inch threaded female fire hose line;
   a second outlet having an external thread and adapted to receive a 1.5 inch threaded female fire hose line, wherein the inlet and the first outlet are at a 90 degree angle to each other and the inlet and the second outlet are 180 degrees to each other; and
   a three-port ball valve having an inlet port, a first outlet port, and a second outlet port.

2. The valve of claim 1, further comprising a valve handle adapted to rotate the ball valve through a series of positions.

3. The valve of claim 2, wherein the valve handle is tear-dropped shaped having a head and a tail and has indicia formed on a surface thereof, said indicia including T-shaped arrows to show relative flow positions of the valve.

4. A valve for a fire hose line comprising:
   an inlet having a threaded female swivel fitting;
   a first outlet having an external thread;
   a second outlet having an external thread, wherein the inlet and the first outlet are at a 90 degree angle to each other and the inlet and the second outlet are 180 degrees to each other;
   a three-port ball valve having an inlet port, a first outlet port, and a second outlet port; and
   a tear-dropped shaped valve handle adapted to rotate the ball valve through four positions and having indicia formed on a surface thereof, said indicia including T-shaped arrows to show relative flow positions of the valve.

5. The valve of claim 4, wherein the threaded female swivel fitting is adapted to receive a hose line having a 1.5 inch external thread.

6. The valve of claim 4, wherein the threaded female swivel fitting has a tapered thread.

7. The valve of claim 4, wherein the first outlet is adapted to receive a 1.0 inch threaded female hose line.

8. The valve of claim 4, wherein the second outlet is adapted to receive a 1.5 inch threaded female hose line.

* * * * *